(12) United States Patent
Wada et al.

(10) Patent No.: US 12,007,071 B2
(45) Date of Patent: Jun. 11, 2024

(54) HYDROGEN PRESSURE VESSEL

(71) Applicant: JAPAN STEEL WORKS M&E, INC., Muroran (JP)

(72) Inventors: Yoru Wada, Tokyo (JP); Takafumi Hosoya, Muroran (JP); Hironobu Arashima, Muroran (JP)

(73) Assignee: Japan Steel Works M&E, Inc., Muroran (JP)

(*) Notice: Subject to any disclaimer, the term of this patent is extended or adjusted under 35 U.S.C. 154(b) by 456 days.

(21) Appl. No.: 17/282,371

(22) PCT Filed: Sep. 12, 2019

(86) PCT No.: PCT/JP2019/035968
§ 371 (c)(1),
(2) Date: Apr. 1, 2021

(87) PCT Pub. No.: WO2020/071088
PCT Pub. Date: Apr. 9, 2020

(65) Prior Publication Data
US 2021/0348724 A1 Nov. 11, 2021

(30) Foreign Application Priority Data
Oct. 2, 2018 (JP) .................................. 2018-187193

(51) Int. Cl.
F17C 13/06 (2006.01)
F17C 1/10 (2006.01)
F17C 13/04 (2006.01)

(52) U.S. Cl.
CPC ................ *F17C 13/06* (2013.01); *F17C 1/10* (2013.01); *F17C 13/04* (2013.01);
(Continued)

(58) Field of Classification Search
CPC .. F17C 13/06; F17C 13/04; F17C 1/10; F17C 2201/0119; F17C 2201/035; F17C 2221/012
(Continued)

(56) References Cited

U.S. PATENT DOCUMENTS 5,331,841 A * 7/1994 Beaver .................. F16L 55/115
73/40.7
2011/0233218 A1 9/2011 Uchimura
(Continued)

FOREIGN PATENT DOCUMENTS

CN 86108606 A 7/1988
CN 202670519 U 1/2013
(Continued)

OTHER PUBLICATIONS

Office Action dated May 30, 2022, in Chinese Patent Application No. 201980064918.3.
(Continued)

*Primary Examiner* — J. Gregory Pickett
*Assistant Examiner* — Niki M Eloshway
(74) *Attorney, Agent, or Firm* — Potomac Law Group, PLLC

(57) ABSTRACT

A hydrogen pressure vessel capable of preventing hydrogen-induced cracking of a cylinder is provided. In a hydrogen pressure vessel according to one embodiment, a gap part (G) in which an inner peripheral surface of a cylinder (10) is spaced apart from an outer peripheral surface of a lid (20) is provided between a female thread part (10a) of the cylinder (10) into which the lid (20) is screwed, and a resin seal member (30), and the cylinder (10) includes a first through hole (41) for discharging gas in the gap part (G) into a relief pipe (51) and a second through hole (42) for introducing gas containing oxygen into the gap part (G) formed therein.

6 Claims, 6 Drawing Sheets

(52) U.S. Cl.
CPC . *F17C 2201/0119* (2013.01); *F17C 2201/035* (2013.01); *F17C 2205/0311* (2013.01); *F17C 2205/0332* (2013.01); *F17C 2205/0335* (2013.01); *F17C 2221/012* (2013.01); *F17C 2260/037* (2013.01); *F17C 2260/053* (2013.01)

(58) Field of Classification Search
USPC .......................................................... 220/582
See application file for complete search history.

(56) References Cited

U.S. PATENT DOCUMENTS

| 2015/0048605 | A1 | 2/2015 | Andersson et al. |
| 2019/0049069 | A1 | 2/2019 | Wada et al. |
| 2023/0133969 | A1* | 5/2023 | Jahn ........................ F17C 13/04 222/3 |
| 2023/0184389 | A1* | 6/2023 | Jahn ........................ F17C 13/04 137/561 R |

FOREIGN PATENT DOCUMENTS

| CN | 104159793 A | 11/2014 |
| CN | 108603636 A | 9/2018 |
| GB | 2 135 901 A | 9/1984 |
| JP | S60-54384 U | 4/1985 |
| JP | 2015-158243 A | 9/2015 |
| WO | WO 92/10702 A1 | 6/1992 |
| WO | WO 2014/178092 A1 | 11/2014 |

OTHER PUBLICATIONS

Standard for Ultra High Pressure Gas Equipment KHKS 0220 (2010), Mar. 31, 2010, The High Pressure Gas Safety Institute of Japan, p. 26.

International Search Report from International Patent Application No. PCT/JP2019/035968, dated Oct. 8, 2019.

Fukuyama, et al., "Fracture Toughness And Fatigue Crack Growth of AISI 4340 Steel in High Pressure Hydrogen at Room Temperature", Pressure Vessel Technology, vol. 2, 1989, pp. 1181-1188.

Nelson, "Testing for Hydrogen Environment Embrittlement: Primary and Secondary Influences", ASTM Special Technical Publication, vol. 543, 1974, pp. 152-169.

Extended European search report dated May 10, 2022, in European Patent Application No. 19869104.0.

* cited by examiner

HYDROGEN PRESSURE VESSEL

TECHNICAL FIELD

The present disclosure relates to a hydrogen pressure vessel, and relates to, for example, a hydrogen pressure vessel that screws a lid into an opening end of a cylinder.

BACKGROUND ART

In a high-pressure hydrogen pressure vessel used for a hydrogen station or the like, a structure in which, for example, a lid is screwed into an opening end of a cylinder (cylindrical body) has been employed, as disclosed in Patent Literature 1 and Non-Patent Literature 1. In this hydrogen pressure vessel, the cylinder is filled with hydrogen gas and then the cylinder is sealed by a resin seal member (e.g., O-ring) provided between an inner circumferential surface of the cylinder and an outer circumferential surface of the lid. Therefore, it is difficult for the hydrogen to reach a female thread formed in the opening end of the cylinder and thus hydrogen induced cracking which starts from a root of a thread where stress is concentrated is unlikely to occur.

Incidentally, Non-Patent Literature 2 discloses that when low-concentration oxygen is contained in hydrogen gas, a crack growth rate of hydrogen induced cracking is reduced. Further, Non-Patent Literature 3 discloses that oxygen is adsorbed on the crack surface of hydrogen induced cracking, which prevents hydrogen from entering the material. As shown in these techniques, it has been known that oxygen prevents hydrogen induced cracking.

CITATION LIST

Patent Literature

[Patent Literature 1] Japanese Unexamined Patent Application Publication No. 2015-158243

Non Patent Literature

[Non-Patent Literature 1] Standard for Ultra High Pressure Gas Equipment KHKS 0220 (2010), Mar. 31, 2010, The High Pressure Gas Safety Institute of Japan, p. 26
[Non-Patent Literature 2] Fukuyama, S. and two others, "Fracture toughness and fatigue crack growth of AISI 4340 steel in high pressure hydrogen at room temperature", Pressure Vessel Technology, Vol. 2, 1989, p. 1181-1188
[Non-Patent Literature 3] Nelson H. G., "Testing for hydrogen environment embrittlement: primary and secondary influences", ASTM Special Technical Publication, vol. 543, 1974, p. 152-169

SUMMARY OF INVENTION

Technical Problem

The present inventors have found that hydrogen permeates through a resin seal member in a hydrogen pressure vessel filled with high-pressure hydrogen gas even though the amount of hydrogen that permeates through the resin seal member is small. Therefore, it is possible that hydrogen may reach a female thread formed in an opening end of a cylinder and thus hydrogen induced cracking may occur in the cylinder starting from a root of the thread where stress is concentrated.

Other problems and novel features will be made apparent from the following description and the accompanying drawings.

Solution to Problem

In a hydrogen pressure vessel according to one embodiment, a gap part in which an inner peripheral surface of a cylinder is spaced apart from an outer peripheral surface of a lid is provided between a female thread part of the cylinder into which the lid is screwed, and a resin seal member, and the cylinder includes a first through hole for discharging gas in the gap part into a relief pipe and a second through hole for introducing gas containing oxygen into the gap part formed therein.

Advantageous Effects of Invention

According to the embodiment, it is possible to provide a hydrogen pressure vessel capable of preventing hydrogen induced cracking of a cylinder.

DESCRIPTION OF EMBODIMENTS

Hereinafter, with reference to the drawings, specific embodiments will be described in detail. However, the present disclosure is not limited to the following embodiments. Further, for the sake of clarification of the description, the following descriptions and the drawings are simplified as appropriate.

First Embodiment

Figure 1:
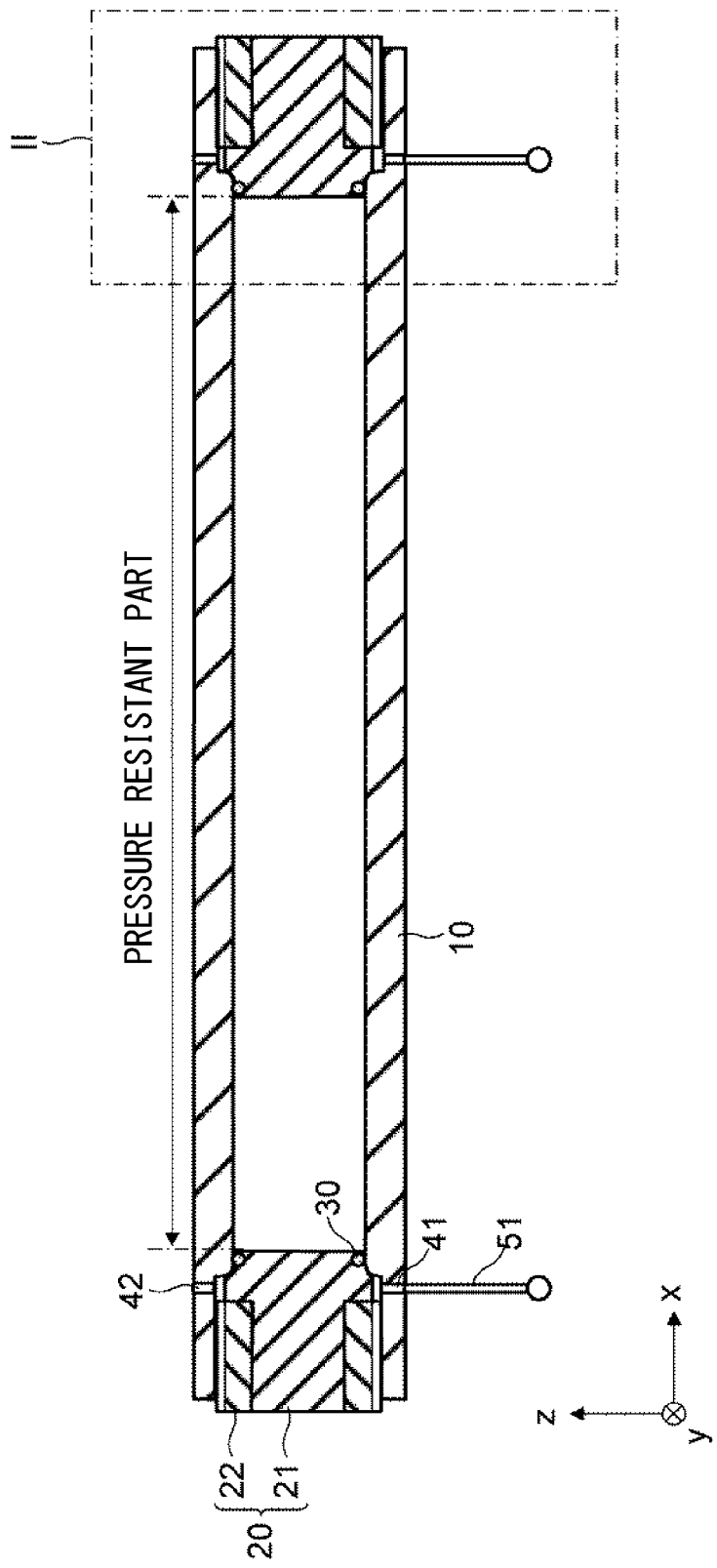
FIG. 1 is a cross-sectional view of a hydrogen pressure vessel according to a first embodiment.
Figure 2:
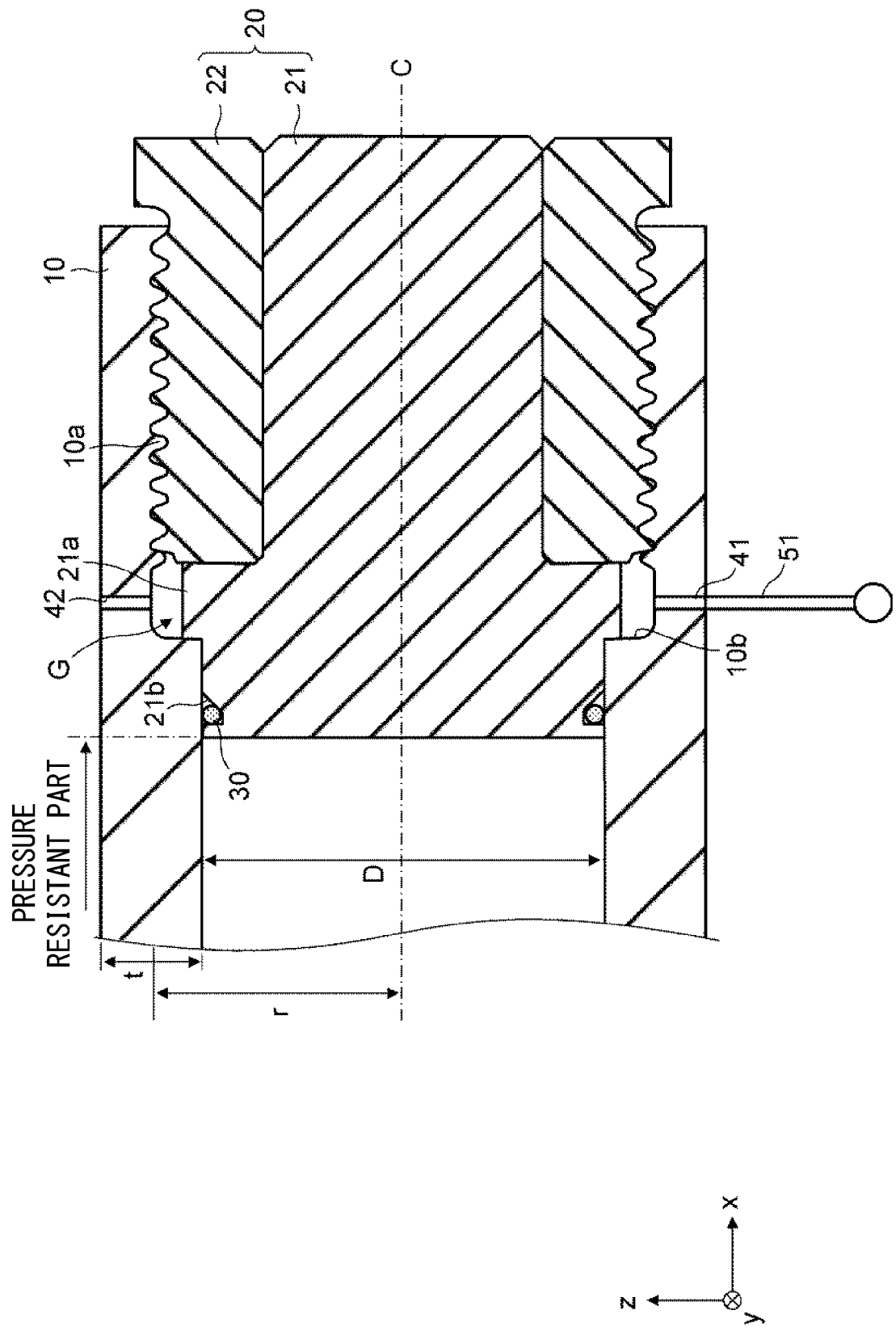
FIG. 2 is an enlarged view of an area II in FIG. 1.

<Structure of Hydrogen Pressure Vessel>
Hereinafter, with reference to FIGS. 1 and 2, a structure of a hydrogen pressure vessel according to a first embodiment will be described. FIG. 1 is a cross-sectional view of the hydrogen pressure vessel according to the first embodiment. FIG. 2 is an enlarged view of an area II in FIG. 1. As shown in FIG. 1, the hydrogen pressure vessel according to the first embodiment includes a cylinder 10, lids 20, and resin seal members 30. The hydrogen pressure vessel according to this embodiment is, for example, a high-pressure hydrogen pressure vessel for a hydrogen station. The design pressure of the hydrogen pressure vessel is, for example, about 80-120 MPa.

Note that the right-handed xyz three-dimensional orthogonal coordinate systems shown in the respective drawings, which are consistent with each other in these figures, are shown just for the sake of convenience for explaining the positional relation among components. Typically, the xy-plane forms a horizontal plane and the positive direction on the z-axis is the vertically upward direction. In the examples shown in the drawings, the longitudinal direction of the hydrogen pressure vessel is parallel to the x-axis direction. In this way, the hydrogen pressure vessel is typically arranged horizontally.

Referring first to FIG. 1, the whole structure of the hydrogen pressure vessel will be described.

As shown in FIG. 1, the lids 20 are screwed into the respective opening ends of the cylinder 10 filled with hydrogen so that they can be opened and/or closed. A space surrounded by the inner circumferential surface of the cylinder 10 and the inner end surfaces of the two lids 20 is filled with high-pressure hydrogen gas. The inside of the cylinder 10 is sealed by the circular resin seal members 30 provided between the inner circumferential surface of the cylinder 10 and the outer circumferential surfaces of the lids 20.

The inner circumferential surface of the cylinder 10 and the inner end surfaces of the lids 20 that receive stress from the high-pressure hydrogen gas are each called a pressure resistant part.

Further, the lid 20 includes a lid body 21 and a nut 22, although the details thereof will be described later.

While a structure in which both end parts of the cylinder 10 are opened is employed in the example shown in FIG. 1, a structure in which only one end part of the cylinder 10 is opened may instead be employed. Further, the outer circumferential surface of the cylinder 10 may be reinforced, for example, by a carbon fiber reinforced plastic layer (not shown).

The cylinder 10 and the lid 20 (the lid body 21 and the nut 22) are each made of, for example, a steel material such as manganese steel, chrome molybdenum steel, or nickel-chrome-molybdenum steel. The cylinder 10, the lid body 21, and the nut 22 may be made of steel of the same type or steel of different types.

The cylinder 10 is, for example, a seamless pipe manufactured by forging or extruding. Regarding the dimensions of the cylinder 10, for example, the internal volume is about 50-1000 L, the total length is about 1800-5000 mm, the inner diameter D (see FIG. 2) is about 200-400 mm, and the thickness t (see FIG. 2) is about 20-80 mm. In order to reduce surface scratches, which cause hydrogen induced cracking, the inner circumferential surface of the cylinder 10 may be mirror-finished. For example, it is preferable to eliminate surface scratches having a depth of 0.5 mm or greater and a length of 1.6 mm or greater.

Referring next to FIG. 2, details of the opening ends of the cylinder 10 will be described. Since the structures of the opening ends of the cylinder 10 are similar to each other, as shown in FIG. 1, the structure of only the opening end of the cylinder 10 on the side of the x-axis positive direction will be described in detail in FIG. 2.

As shown in FIG. 2, in the opening end of the cylinder 10, the inner diameter is enlarged and the inner circumferential surface is threaded. That is, a female thread part 10a is formed in the opening end of the cylinder 10. The nut 22 of the lid 20 is screwed in the opening end of the cylinder 10.

The lid 20 that includes the lid body 21 and the nut 22 has a structure that is in compliance with a "screwing structure" specified in the standard KHKS 0220 by The High Pressure Gas Safety Institute of Japan (Non-Patent Literature 1).

As shown in FIG. 2, the lid body 21 is a cylindrical shaped member with a step having a central axis C that is common to the cylinder 10. The lid body 21 includes a flange part 21a. In the lid body 21, a part having a large diameter located on the side of the x-axis negative direction with respect to the flange part 21a is referred to as a large diameter part and a part having a small diameter located on the side of the x-axis positive direction with respect to the flange part 21a is referred to as a small diameter part.

The diameter of the flange part 21a is larger than the inner diameter of the main body part (part other than the opening end) of the cylinder 10 but smaller than the inner diameter of the opening end of the cylinder 10. Therefore, the lid body 21 can be inserted into the cylinder 10 from the opening end of the cylinder 10. The flange part 21a contacts a step 10b between the main body part of the cylinder 10 and the enlarged opening end.

As shown in FIG. 2, the diameter of the large diameter part of the lid body 21 is substantially equal to the inner diameter of the main body part of the cylinder 10 and the lid body 21 is fitted into the main body part of the cylinder 10. On the other hand, the small diameter part of the lid body 21 has an axis diameter that is substantially equal to the inner diameter of the nut 22 and is fitted into the through hole of the nut 22. The small diameter part of the lid body 21 and the nut 22 can be rotated relative to each other. Further, in the example shown in FIG. 2, the length of the small diameter part of the lid body 21 is substantially equal to the height of the nut 22 (the length in the x-axis direction).

The nut 22 is a male thread nut having a central axis C that is common to the cylinder 10. That is, the outer circumferential surface of the nut 22 is threaded. The nut 22 is screwed into the opening end of the cylinder 10 while inserting the small diameter part of the lid body 21 into the through hole of the nut 22, whereby the lid 20 is fixed to the cylinder 10. Specifically, when the nut 22 is screwed into the opening end of the cylinder 10, the nut 22 moves forward in the x-axis negative direction. When the nut 22 presses the flange part 21a against the step 10b of the cylinder 10, the nut 22 does not move forward any further and the lid body 21 and the nut 22 are fixed to the cylinder 10. In this way, the flange part 21a serves as a stopper when the nut 22 is screwed into the opening end of the cylinder 10.

The resin seal member 30, which is, for example, an O-ring, is a circular resin member having a central axis C that is common to the cylinder 10. As shown in FIG. 2, the resin seal member 30 is provided between the inner circumferential surface of the cylinder 10 and the outer circumferential surface of the lid 20. More specifically, as shown in FIG. 2, the resin seal member 30 is fitted into the annular groove 21b formed on the outer circumferential surface of the large diameter part of the lid body 21. That is, the inside of the cylinder 10 is sealed by the resin seal member 30 that is provided between the inner circumferential surface of the main body part of the cylinder 10 and the outer circumferential surface of the large diameter part of the lid body 21.

As shown in FIG. 2, a gap part G in which the inner circumferential surface of the cylinder 10 is spaced apart from the outer circumferential surface of the lid 20 is provided between the resin seal member 30 and the female thread part 10a of the cylinder 10. Specifically, a circular gap part G having a band shape is provided in the outer circumference of the flange part 21a of the lid body 21.

In the hydrogen pressure vessel according to this embodiment, besides a through hole (a first through hole) 41 that discharges gas inside the gap part G to a relief pipe 51, a through hole (a second through hole) 42 that introduces gas including oxygen into the gap part G is formed in the cylinder 10. The gas including oxygen is, for example, but not particularly limited thereto, air. The relief pipe 51 is a pipe for safely releasing the hydrogen gas leaked from the inside of the cylinder 10 to the gap part G into the atmosphere. In case of an emergency such as a case in which, for example, a defect occurs in the resin seal member 30, the hydrogen gas is released via the relief pipe 51.

As described above, the present inventors have found that hydrogen permeates through the resin seal member 30 in the hydrogen pressure vessel filled with high-pressure hydrogen gas even though the amount of hydrogen that permeates through the resin seal member is small. In this case, it is possible that the hydrogen may reach the female thread part 10a of the cylinder 10 via the gap part G and thus hydrogen induced cracking may occur in the cylinder starting from a root of the thread where stress is concentrated.

In order to solve the above problem, with the hydrogen pressure vessel according to this embodiment, besides the through hole 41 connected to the relief pipe 51, the through hole 42 is formed in the cylinder 10. Since the through hole 41 is connected to the relief pipe 51, gas including oxygen, i.e., air can be taken into the gap part G from the through hole 42 by, for example, natural convection. Since the gap part G communicates with the female thread part 10a of the cylinder 10, oxygen that effectively prevents hydrogen induced cracking reaches a root of the thread of the female thread part 10a. As a result, it is possible to prevent hydrogen induced cracking of the cylinder 10 which starts from the root of the thread.

The positions where the through holes 41 and 42 are formed are not particularly limited as long as they are between the resin seal member 30 and the female thread part 10a of the cylinder 10. The closer the positions of the through holes 41 and 42 are to the pressure resistant part, that is, the closer they are to the resin seal member 30, the larger the effect of stress received from the high-pressure hydrogen gas the cylinder 10 is filled with. In particular, stress that occurs in the corner parts of the through holes 41 and 42 on the inner circumferential surface of the cylinder 10 becomes higher. Therefore, the positions where the through holes 41 and 42 are formed are preferably spaced apart from the resin seal member 30 in the x-axis positive direction in FIG. 2.

Specifically, it is considered that the stress received from the high-pressure hydrogen gas affects a range of about $2.5 \times (r \times t)^{1/2}$ [mm] in the x-axis positive direction from the pressure resistant part using the average radius r [mm] and the thickness t [mm] of the cylinder 10 shown in FIG. 2. The average radius r of the cylinder 10 is an average value of the inner radius and the outer radius of the cylinder 10. Therefore, the average radius r [mm] may be expressed as $r=(D+t)/2$ using the inner diameter D [mm] and the thickness t [mm].

On the other hand, when the through holes 41 and 42 are too close to the female thread part 10a, the stress that occurs in the female thread part 10a increases.

Therefore, as shown in FIG. 2, for example, the through holes 41 and 42 are formed in the central part in the longitudinal direction (x-axis direction) of the cylinder 10 that is opposed to the gap part G.

The through hole 41 connected to the relief pipe 51 is arranged, for example, but not particularly limited thereto, vertically downward. With this structure, moisture accumulated in the gap part G due to condensation or the like can be discharged along with gas. On the other hand, the through hole 42 for introducing oxygen is, for example, but not particularly limited thereto, opposed to the through hole 41 via the lid 20. With this structure, oxygen introduced from the through hole 42 flows toward the through hole 41, which causes oxygen to be easily distributed throughout the gap part G.

As the diameters of the through holes 41 and 42 become larger, the stress applied to a stress concentrated part becomes high and cracks that are due to metal fatigue are likely to occur. On the other hand, when the diameters of the through holes 41 and 42 are too small, release of hydrogen gas and introduction of oxygen is unlikely to occur and it becomes difficult to round the corner parts of the through holes 41 and 42 on the inner circumferential surface of the cylinder 10. Therefore, the diameters of the through holes 41 and 42 are each, for example, about 2-5% of the average radius r [mm] of the cylinder 10. As one example, the diameters of the through holes 41 and 42 are each about 2-12 mm.

Further, the corner parts of the through holes 41 and 42 on the inner circumferential surface of the cylinder 10 may be, for example, rounded since sharp corner parts tend to cause cracks that are due to metal fatigue.

A plurality of through holes 41 and a plurality of through holes 42 may be provided.

<Structure of Hydrogen Pressure Vessel According to Comparative Example>

Figure 3:
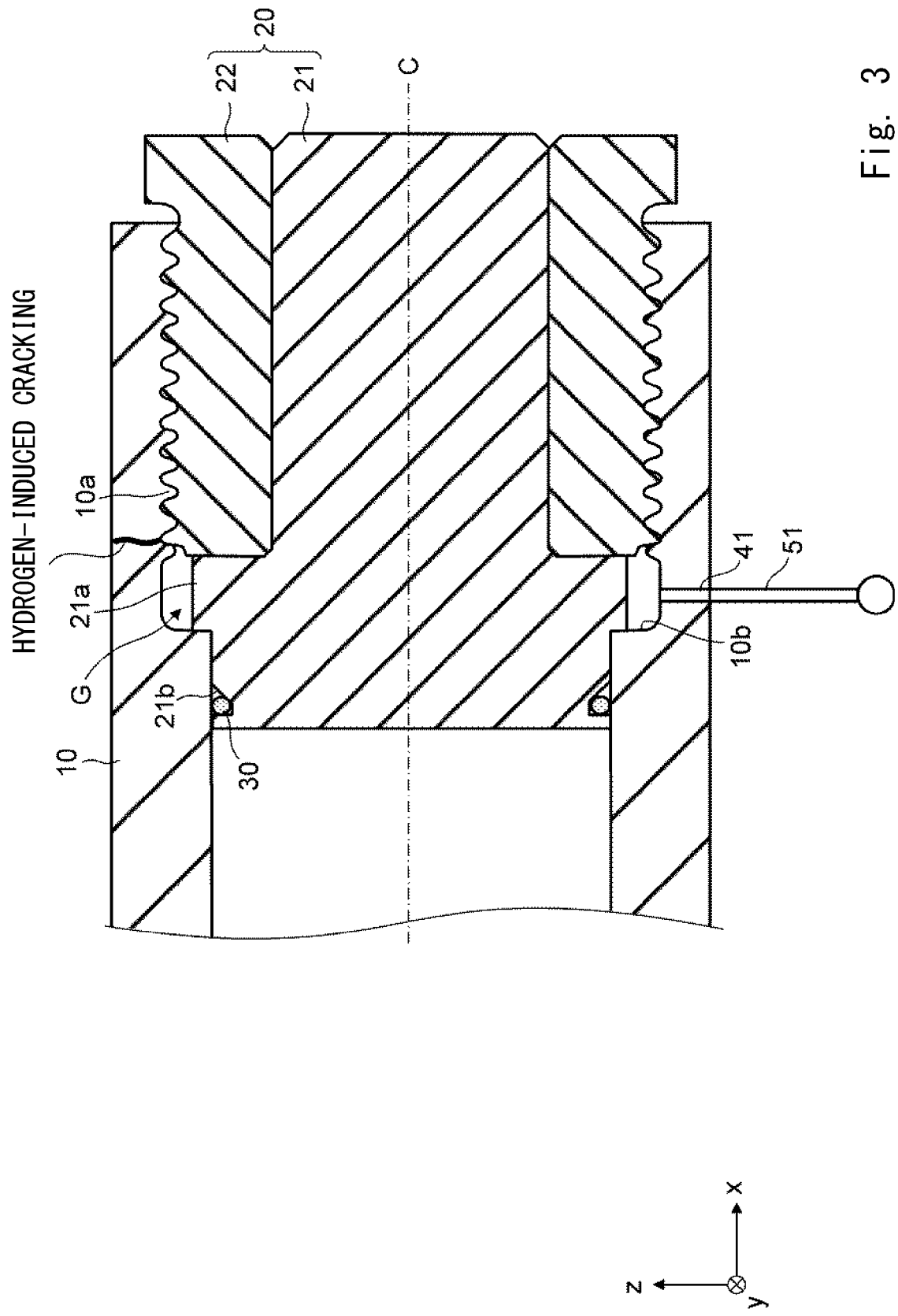
FIG. 3 is a cross-sectional view of a hydrogen pressure vessel according to a comparative example.

Referring now to FIG. 3, a structure of a hydrogen pressure vessel according to a comparative example will be described. FIG. 3 is a cross-sectional view of the hydrogen pressure vessel according to the comparative example. FIG. 3 is a diagram that corresponds to FIG. 2.

As shown in FIG. 3, in the hydrogen pressure vessel according to the comparative example, only a through hole 41 that discharges gas inside a gap part G to a relief pipe 51 is formed in a cylinder 10 and a through hole 42 that introduces gas including oxygen into the gap part G shown in FIG. 2 is not formed.

Therefore, oxygen that effectively prevents hydrogen induced cracking cannot be introduced into the gap part G. As a result, hydrogen induced cracking which starts from a root of the thread where stress is concentrated occurs in the cylinder 10. In particular, cracking is more likely to occur at a root of the thread that is closer to the gap part G.

Note that hydrogen induced cracking in the above hydrogen pressure vessel is a fatigue failure due to repeated filling and release of the high-pressure hydrogen gas.

As described above, in the hydrogen pressure vessel according to this embodiment, the through hole 42 that introduces gas including oxygen into the gap part G is formed in the cylinder 10. Therefore, oxygen that effectively prevents hydrogen induced cracking can be introduced into the gap part G from the through hole 42. Since the oxygen introduced into the gap part G reaches the root of the thread of the female thread part 10a, hydrogen induced cracking of the cylinder 10 which starts from the root of the thread can be reduced.

Second Embodiment

Figure 4:
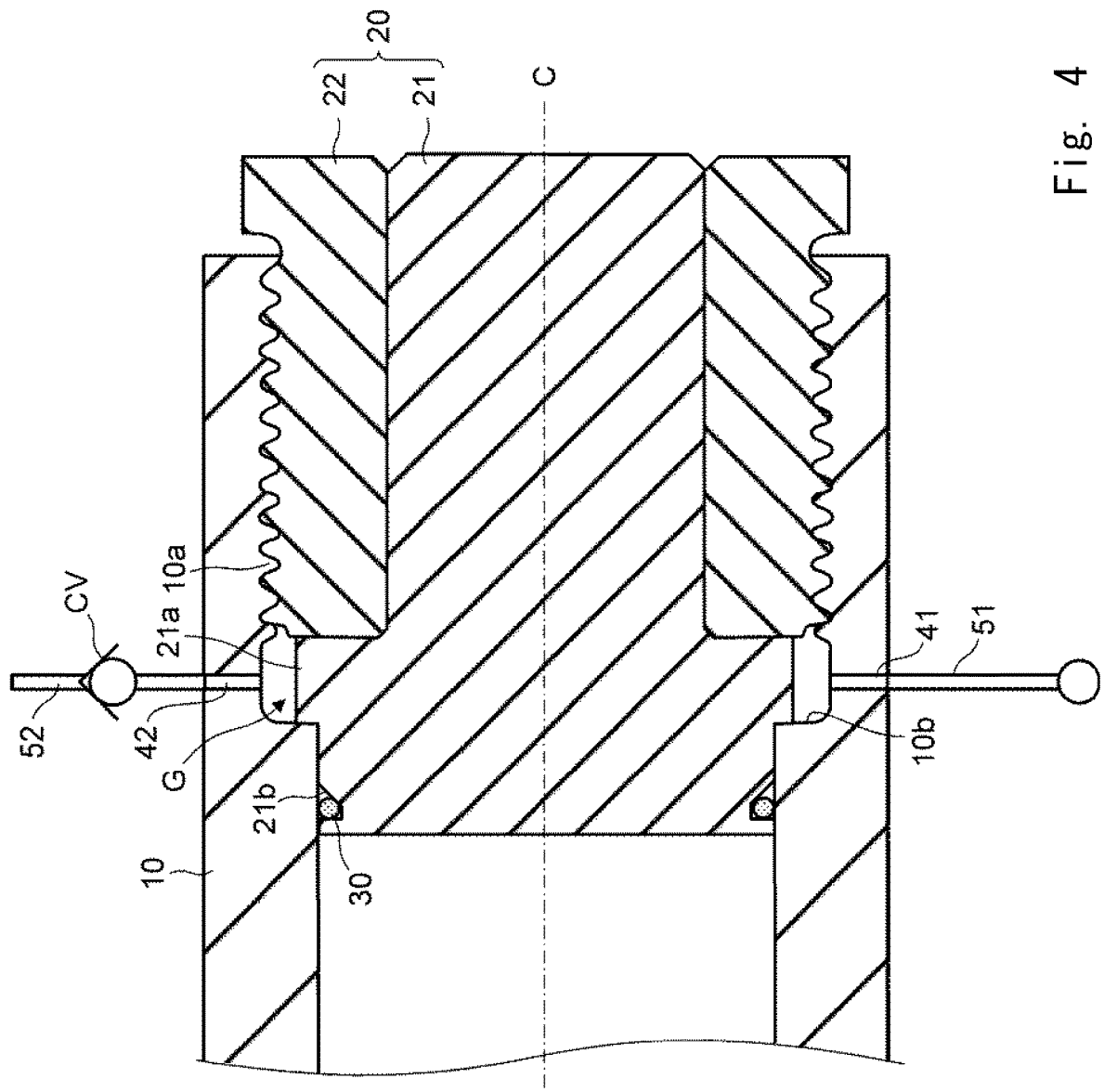
FIG. 4 is a cross-sectional view of a hydrogen pressure vessel according to a second embodiment.
Figure 4:
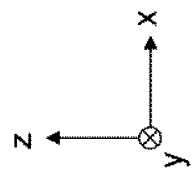

Referring next to FIG. 4, a structure of a hydrogen pressure vessel according to a second embodiment will be described. FIG. 4 is a cross-sectional view of the hydrogen pressure vessel according to the second embodiment. FIG. 4 is a diagram that corresponds to FIG. 2 according to the first embodiment.

As shown in FIG. 4, in the hydrogen pressure vessel according to the second embodiment, a through hole 42 that introduces gas including oxygen into a gap part G is connected to a check valve CV via an introduction pipe 52. The other structures are similar to those of the hydrogen pressure vessel according to the first embodiment shown in FIG. 2.

Like in the hydrogen pressure vessel according to the first embodiment, in the hydrogen pressure vessel according to the second embodiment as well, oxygen that effectively prevents hydrogen induced cracking can be introduced into the gap part G from the through hole 42. As a result, hydrogen induced cracking of the cylinder 10 which starts from a root of a thread can be reduced.

Further, since the through hole 42 is connected to the check valve CV in the hydrogen pressure vessel according to the second embodiment, gas inside the gap part G is not discharged from the through hole 42. Therefore, in case of an emergency such as a case in which, for example, a defect occurs in the resin seal member 30, hydrogen gas is safely released into the atmosphere from the relief pipe 51 via the through hole 41 instead of being released from the through hole 42.

On the other hand, in the hydrogen pressure vessel according to the first embodiment, in the above case, the hydrogen gas may be released via the through hole 42. However, even when hydrogen gas is released via the through hole 42 in the hydrogen pressure vessel according to the first embodiment, the amount of the hydrogen gas that is released is so small that there is no particular safety concern.

Third Embodiment

Figure 5:
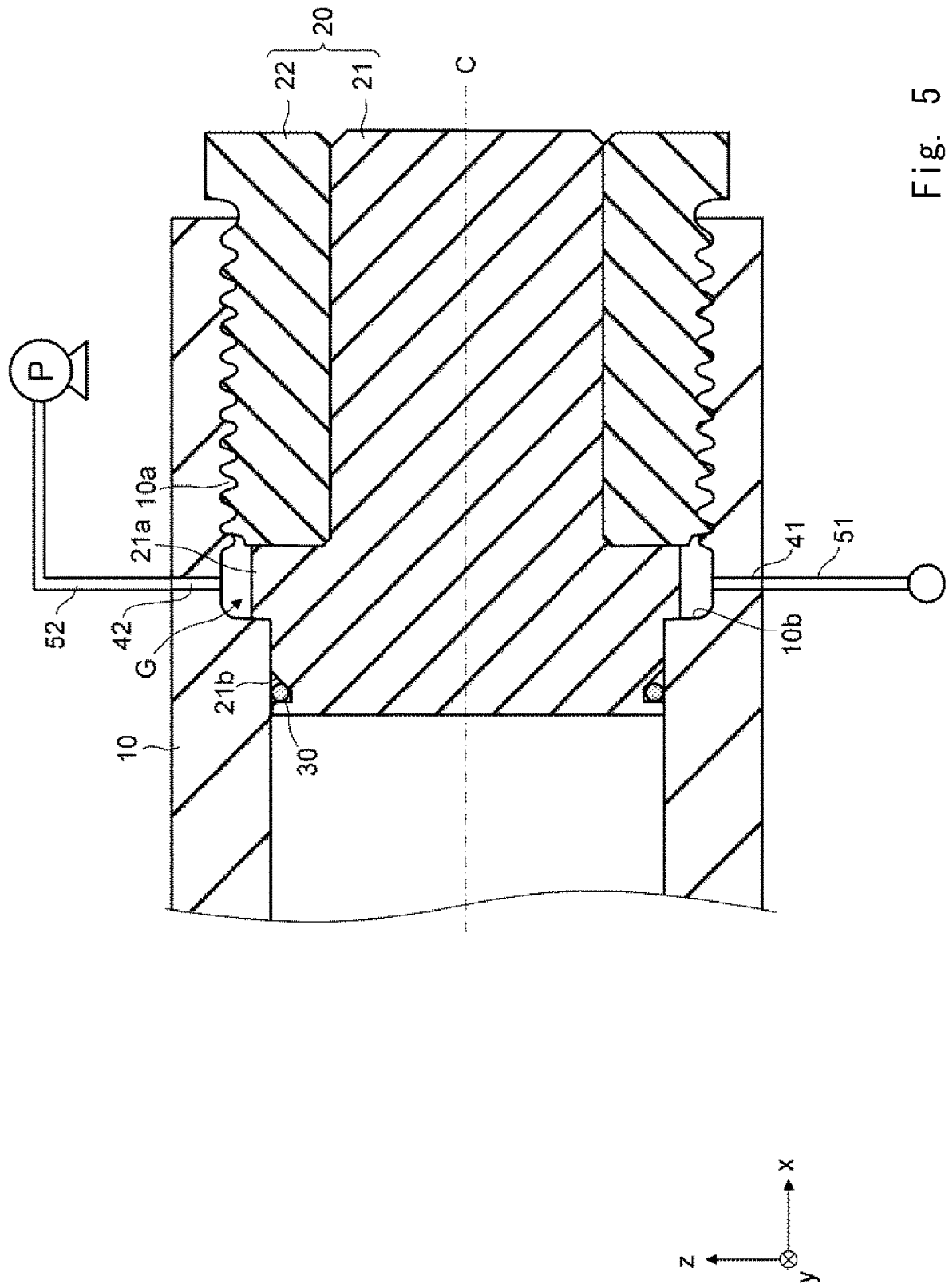
FIG. 5 is a cross-sectional view of a hydrogen pressure vessel according to a third embodiment.

Referring next to FIG. 5, a structure of a hydrogen pressure vessel according to a third embodiment will be described. FIG. 5 is a cross-sectional view of the hydrogen pressure vessel according to the third embodiment. FIG. 5 is a diagram that corresponds to FIG. 2 according to the first embodiment.

As shown in FIG. 5, in the hydrogen pressure vessel according to the third embodiment, a through hole 42 that introduces gas including oxygen into a gap part G is connected to a pump P via an introduction pipe 52. The other structures are similar to those of the hydrogen pressure vessel according to the first embodiment shown in FIG. 2.

Like in the hydrogen pressure vessel according to the second embodiment, a check valve CV may be provided in the introduction pipe 52 provided between the through hole 42 and the pump P.

Since the hydrogen pressure vessel according to the third embodiment includes the pump P, it is possible to forcibly introduce oxygen that effectively prevents hydrogen induced cracking into the gap part G from the through hole 42. As a result, it is possible to reduce hydrogen induced cracking of the cylinder 10 which starts from a root of a thread more efficiently than in the hydrogen pressure vessel according to the first embodiment.

Fourth Embodiment

Figure 6:
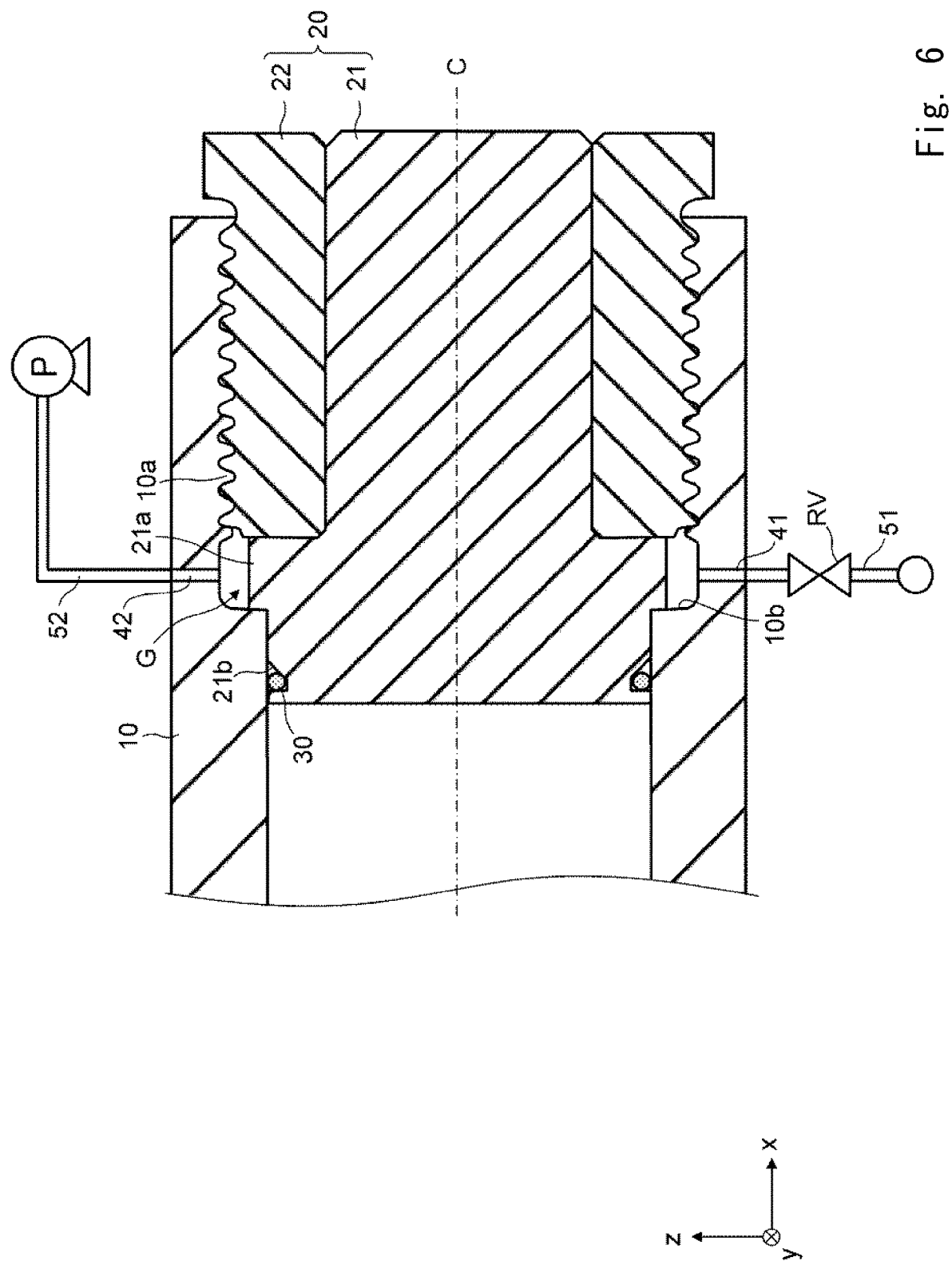
FIG. 6 is a cross-sectional view of a hydrogen pressure vessel according to a fourth embodiment.

Referring next to FIG. 6, a structure of a hydrogen pressure vessel according to a fourth embodiment will be described. FIG. 6 is a cross-sectional view of the hydrogen pressure vessel according to the fourth embodiment. FIG. 6 is a diagram that corresponds to FIG. 2 according to the first embodiment.

As shown in FIG. 6, in the hydrogen pressure vessel according to the fourth embodiment, a relief valve RV is provided in a relief pipe 51. The relief valve RV is closed when the pressure of a gap part G is an atmospheric pressure and is opened when the pressure of the gap part G is raised up to a predetermined pressure from the atmospheric pressure. The other structures are similar to those of the hydrogen pressure vessel according to the third embodiment shown in FIG. 5.

Like in the hydrogen pressure vessel according to the second embodiment, a check valve CV may be provided in the introduction pipe 52 which is provided between the through hole 42 and the pump P.

Like in the hydrogen pressure vessel according to the third embodiment, the hydrogen pressure vessel according to the fourth embodiment includes a pump P. It is therefore possible to forcibly introduce oxygen that effectively prevents hydrogen induced cracking into the gap part G from the through hole 42.

The hydrogen pressure vessel according to the fourth embodiment further includes the relief valve RV in the relief pipe 51. Therefore, by raising the pressure inside the gap part G, the oxygen partial pressure in the gap part G can be increased while preventing permeation of hydrogen in the resin seal member 30. As a result, hydrogen induced cracking of the cylinder 10 which starts from a root of a thread can be prevented more efficiently than in the hydrogen pressure vessel according to the third embodiment.

While the disclosure made by the present inventors has been specifically described based on the embodiments, it is needless to say that the present disclosure is not limited to these embodiments and may be changed in various ways without departing from the spirit of the present disclosure.

This application is based upon and claims the benefit of priority from Japanese Patent Application No. 2018-187193, filed on Oct. 2, 2018, the disclosure of which is incorporated herein in its entirety by reference.

REFERENCE SIGNS LIST

10 Cylinder
10*a* Female Thread Part
10*b* Step
20 Lid
21 Lid Body
21*a* Flange Part
21*b* Annular Groove
22 Nut
30 Resin Seal Member
41, 42 Through hole
51 Relief Pipe
52 Introduction Pipe
CV Check Valve
G Gap Part
P Pump
RV Relief Valve

The invention claimed is:

1. A hydrogen pressure vessel comprising:
    a cylinder filled with hydrogen and integrally formed as a single piece, a portion of an opening end of the cylinder being threaded;
    a lid screwed into the threaded portion of the cylinder;
    a circular resin seal member provided between an inner circumferential surface of the cylinder and an outer circumferential surface of the lid;
    a gap part formed between the inner circumferential surface of the cylinder and the outer circumferential surface of the lid, the gap part being provided between the threaded portion of the cylinder and the resin seal member such that the gap part communicates with threads of the threaded portion of the cylinder; and a first through hole for discharging gas in the gap part to a relief pipe and a second through hole for introducing gas including oxygen into the gap part formed in the cylinder.

2. The hydrogen pressure vessel according to claim 1, further comprising a check valve connected to the second through hole.

3. The hydrogen pressure vessel according to claim 1, further comprising a pump connected to the second through hole.

4. The hydrogen pressure vessel according to claim 3, further comprising a relief valve provided in the relief pipe.

5. The hydrogen pressure vessel according to claim 1, wherein the second through hole is provided in a central part in the longitudinal direction of the cylinder that is opposed to the gap part.

6. The hydrogen pressure vessel according to claim 1, wherein a corner part of the second through hole on an inner circumferential surface of the cylinder is rounded.

* * * * *